United States Patent
Hamano et al.

(10) Patent No.: US 9,673,467 B2
(45) Date of Patent: Jun. 6, 2017

(54) MEMBRANE ELECTRODE ASSEMBLY AND FUEL CELL

(71) Applicant: TOYOTA JIDOSHA KABUSHIKI KAISHA, Toyota-shi, Aichi-ken (JP)

(72) Inventors: Masato Hamano, Toyota (JP); Hiroo Yoshikawa, Toyota (JP); Tsunemasa Nishida, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/923,870

(22) Filed: Oct. 27, 2015

(65) Prior Publication Data

US 2016/0141695 A1    May 19, 2016

(30) Foreign Application Priority Data

Nov. 13, 2014  (JP) .................................. 2014-230631

(51) Int. Cl.
  *H01M 8/1004*  (2016.01)
  *H01M 4/86*    (2006.01)
  *H01M 8/1018*  (2016.01)

(52) U.S. Cl.
  CPC ....... *H01M 8/1004* (2013.01); *H01M 4/8636* (2013.01); *H01M 2008/1095* (2013.01)

(58) Field of Classification Search
  CPC ....... H01M 8/1004; H01M 2008/1095; H01M 4/8636
  See application file for complete search history.

(56) References Cited

U.S. PATENT DOCUMENTS

2004/0115502 A1    6/2004  Fukuda et al.

FOREIGN PATENT DOCUMENTS

| JP | H08-088088 | | 4/1996 | |
| JP | 2004-193106 | A | 7/2004 | |
| JP | 2008-176990 | A | 7/2008 | |
| JP | 2010-218721 | A | 9/2010 | |
| JP | 2010-251140 | * | 11/2010 | ............. H01M 4/86 |
| JP | 2013-093168 | A | 5/2013 | |

\* cited by examiner

*Primary Examiner* — Barbara Gilliam
*Assistant Examiner* — Angela Martin
(74) *Attorney, Agent, or Firm* — Finnegan, Henderson, Farabow, Garrett & Dunner, LLP (57) ABSTRACT

An object is to prevent an increase in overall thickness of a membrane electrode assembly. There is provided a membrane electrode assembly. The membrane electrode assembly comprises an electrolyte membrane; a catalyst layer that is formed on a surface of the electrolyte membrane and includes a catalyst and an ionomer; and a gas diffusion layer that is formed on a surface of the catalyst layer on an opposite side to the electrolyte membrane. The catalyst layer includes a first layer that is in contact with the electrolyte membrane and a second layer that is in contact with the gas diffusion layer. An amount of the ionomer in a first portion of the first layer that is in contact with the electrolyte membrane is larger than an amount of the ionomer in a second portion of the first layer that is in contact with the second layer. An amount of the ionomer in a third portion of the second layer that is in contact with the gas diffusion layer is larger than the amount of the ionomer in the first portion.

3 Claims, 5 Drawing Sheets

MEMBRANE ELECTRODE ASSEMBLY AND FUEL CELL

CROSS-REFERENCE TO RELATED APPLICATIONS

The present application claims priority from Japanese patent application P2014-230631 filed on Nov. 13, 2014, the entirety of disclosure of which is hereby incorporated by reference into this application.

BACKGROUND

Field

The present invention relates to a membrane electrode assembly and a fuel cell including the membrane electrode assembly.

Related Art

A fuel cell includes a membrane electrode assembly configured by stacking a catalyst layer and a gas diffusion layer in this sequence on each surface of an electrolyte membrane. As described in JP 2010-251140A, one proposed technique uses a catalyst layer divided into a first layer portion that is in contact with the electrolyte membrane, a second layer portion that is in contact with the gas diffusion layer and a third layer portion that is located between the first layer portion and the second layer portion, and sets amounts of ionomer in the first layer portion and the second layer portion to be larger than an amount of ionomer in the third layer portion. This reduces the transfer resistance of hydrogen ion ($H^+$, also called "proton"), enhances the gas diffusibility, and additionally prevents a decrease in water content in the electrolyte membrane and the catalyst layer.

SUMMARY

The above prior art, however, has a problem that the increased thickness of the catalyst layer results in increasing the overall thickness of the membrane electrode assembly. Other needs include, for example, cost reduction, resource saving and easy manufacture.

In order to solve at least part of the above problems, the invention may be implemented by any of the following aspects.

(1) According to one aspect of the invention, there is provided a membrane electrode assembly. The membrane electrode assembly may comprise an electrolyte membrane; a catalyst layer that is formed on a surface of the electrolyte membrane and includes a catalyst and an ionomer; and a gas diffusion layer that is formed on a surface of the catalyst layer on an opposite side to the electrolyte membrane. The catalyst layer may include a first layer that is in contact with the electrolyte membrane and a second layer that is in contact with the gas diffusion layer. An amount of the ionomer in a first portion of the first layer that is in contact with the electrolyte membrane may be larger than an amount of the ionomer in a second portion of the first layer that is in contact with the second layer. An amount of the ionomer in a third portion of the second layer that is in contact with the gas diffusion layer may be larger than the amount of the ionomer in the first portion. The "amount ionomer" herein denotes mass (g) of ionomer per unit area (1 $cm^3$). For example, when the first portion has a volume of Va1 ($cm^3$) and contains a mass Ma1 (g) of the ionomer, the amount ionomer in the first portion is Ma1/Va1 ($g/cm^3$). In calculation of the amount of ionomer, a target portion for calculation of the amount of ionomer is divided into a plurality of blocks, and the amounts of ionomer in the plurality of blocks are respectively calculated. An average of the calculated amounts of ionomer in the plurality of blocks is specified as the amount of ionomer in the target portion. The term "amount of ionomer" in the description and in the claims has the same meaning.

In the membrane electrode assembly of the above configuration, the amount of the ionomer in the third portion of the second layer that is in contact with the gas diffusion layer is larger than the amount of the ionomer in the first portion of the first layer that is in contact with the electrolyte membrane. Setting the amount of the ionomer in the first portion to be smaller than the amount of the ionomer the third portion reduces the total thickness of the catalyst layer, compared with setting the amount of ionomer in the first portion to be equal to the amount of the ionomer in the third portion. In general, the adhesion force to an adjacent layer decreases with a decrease in amount of ionomer. The electrolyte membrane that is in contact with the first portion of the first layer of the catalyst layer is, however, generally made of some kind of ionomer. Even when the first portion of the first layer has a reduced amount of the ionomer, the ionomer of the electrolyte membrane serves as compensation to ensure the adhesion force between the first layer and the electrolyte membrane. Accordingly even when the amount of the ionomer in the first portion of the first layer is smaller than the amount of the ionomer in the third portion of the second layer, the configuration of the membrane electrode assembly allows for reduction in total thickness of the catalyst layer, while maintaining the adhesion force between the electrolyte membrane and the catalyst layer. This results in reducing the overall thickness of the membrane electrode assembly. Additionally, the amount of the ionomer in the first portion of the first layer that is in contact with the electrolyte membrane is larger than the amount of the ionomer in the second portion of the first layer that is in contact with the second layer. This reduces the transfer resistance of the proton.

(2) In the membrane electrode assembly of the above aspect, when the catalyst layer has a thickness D, and the second layer of the catalyst layer may have a thickness equal to or less than $0.05 \cdot D$. The membrane electrode assembly of this aspect reduces the amount of the ionomer with a decrease in thickness and thereby enhances the drainage performance. This reduces the water content between the second layer of the catalyst layer and the gas diffusion layer and decreases the gas diffusion resistance, thereby improving the power generation performance of the fuel cell.

(3) According to another aspect of the invention, there is provided a fuel cell. The fuel cell may comprise the membrane electrode assembly of the above aspect; and a pair of separators that are arranged to place the membrane electrode assembly therebetween. This configuration allows for reduction of the overall thickness of the membrane electrode assembly and thereby size reduction of the fuel cell.

The following describes some embodiments of the invention.

DESCRIPTION OF THE EMBODIMENTS

A. General Configuration

Figure 1A:
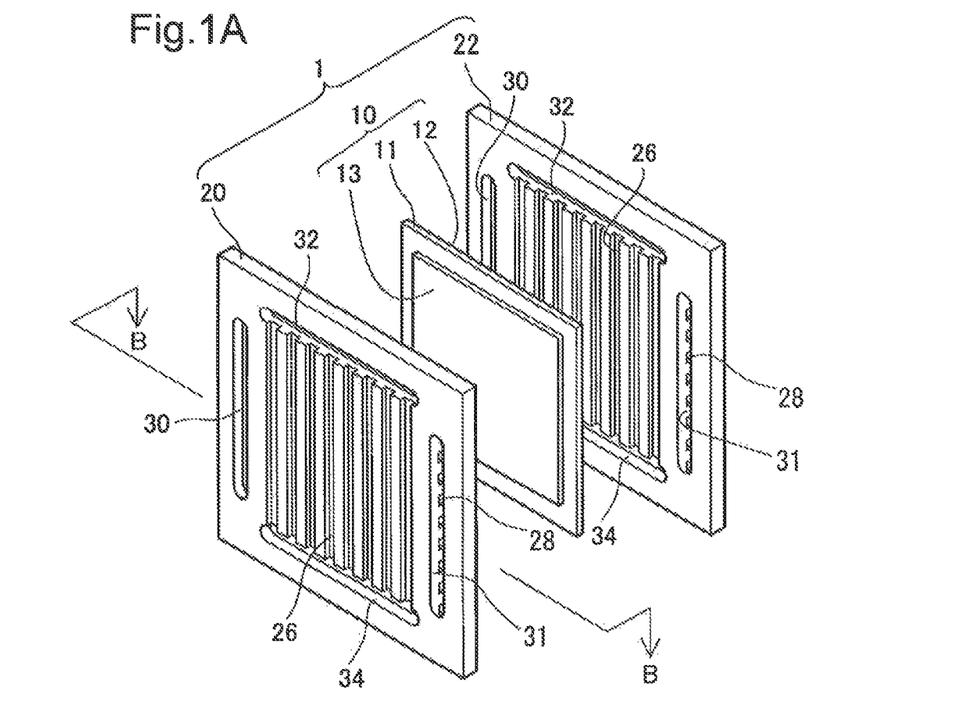
FIGS. 1A and 1B are diagrams illustrating the schematic configuration of a unit cell including a membrane electrode assembly according to one embodiment of the invention.
Figure 1B:
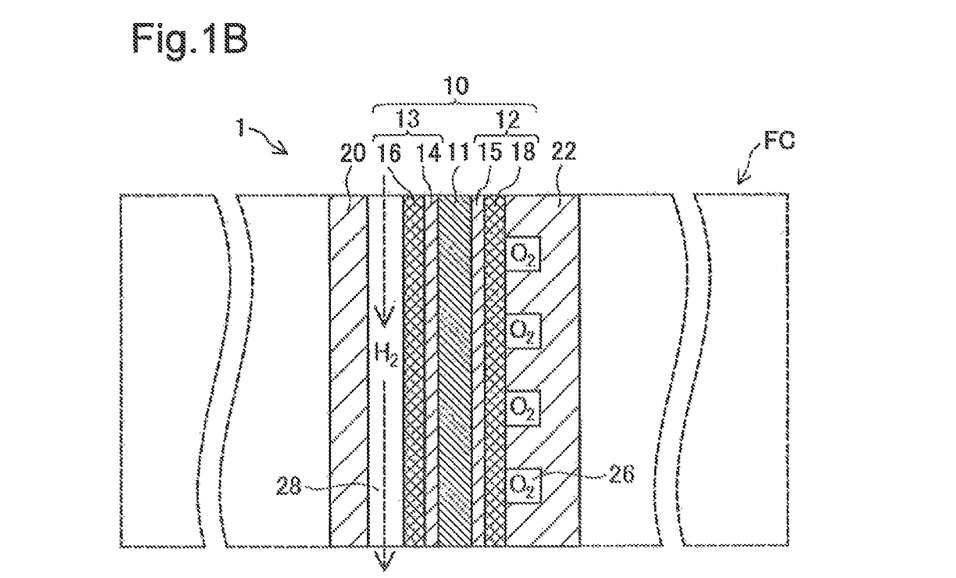

FIGS. 1A and 1B are diagrams illustrating the schematic configuration of a unit cell 1 including a membrane electrode assembly 10 according to one embodiment of the invention. FIG. 1A is an exploded perspective view illustrating the unit cell 1. FIG. 1B is diagram schematically illustrating a B-B section of FIG. 1A. A polymer electrolyte fuel cell FC is configured to have stacked structure by stacking a plurality of the unit cells 1. The polymer electrolyte fuel cell FC is produced by placing the stacked body of the plurality of unit cells 1 between two end plates. As shown in FIG. 1A, the unit cell 1 includes a membrane electrode assembly 10 that is obtained by forming a cathode 12 and an anode 13 on respective surfaces of an electrolyte membrane 11, and separators 20 and 22 placed across the membrane electrode assembly 10. For convenience of illustration, the cathode 12 is located at a position hidden by the electrolyte membrane 11. As shown in FIG. 1B, the cathode 12 includes a cathode catalyst layer 15 formed on one surface of the electrolyte membrane 11 and a cathode gas diffusion layer 18 formed on the cathode catalyst layer 15. The anode 13 includes an anode catalyst layer 14 formed on the other surface of the electrolyte membrane 11 and an anode gas diffusion layer 16 formed on the anode catalyst layer 14. The membrane electrode assembly in the description hereof denotes a structure obtained by stacking an electrolyte membrane, catalyst layers and gas diffusion layers in the above sequence.

The electrolyte membrane 11 is made of a proton-conductive solid polymer electrolyte. More specifically, a solid polymer electrolyte membrane made of a fluorinated sulfonic acid polymer resin (for example, Nation (registered trademark by DuPont)) may be employed for the electrolyte membrane 11. The catalyst layers 14 and 15 are comprised of a carrier with a catalyst supported thereon and an ionomer provided to cover the circumference of the carrier. More specifically, for example, the catalyst layers 14 and 15 are comprised of carbon particles with platinum supported thereon and an ionomer. The specific configuration and the production method of the catalyst layers 14 and 15 will be described later. The gas diffusion layers 16 and 18 are made of a material having gas permeability and good electrical conductivity. Examples of such material are carbon paper and carbon cloth.

The separators 20 and 22 are made of a material having poor hydrogen permeability and good electrical conductivity. An example used for such material is formed by mixing an electrically conductive material with a resin. The separators 20 and 22 are members placed in the unit cell 1 to form gas flow paths which reactive gases (hydrogen-containing fuel gas and oxygen-containing oxidizing gas) flow through. Grooves 26 and 28 are formed in the respective surfaces of the separators 20 and 22 to provide gas flow paths. More specifically, as shown in FIGS. 1A and 1B, the fuel gas flows in the grooves 28 formed in one of the two surfaces of the separator 20 that is in contact with the anode 13, and the oxidizing gas flows in the grooves 26 formed in one of the two surfaces of the separator 22 that is in contact with the cathode 12. The separators 20 and 22 have the grooves 26 formed in one surface and the grooves 28 formed in the other surface.

The separators 20 and 22 have through holes 30, 31, 32 and 34 at corresponding positions close to the respective outer peripheries. When a plurality of the unit cells 1 are stacked to assemble a fuel cell, the through holes 30, 31, 32 and 34 of the respective unit cells 1 are aligned to form flow paths that are arranged to pass through inside of the fuel cell along the stacking direction of the unit cells 1. More specifically, the through holes 30, 31, 32 and 34 form reactive gas supply manifolds configured to supply the reactive gas to the grooves 26 or 28 and reactive gas discharge manifolds configured to discharge the reactive gas passing through the anode 12 or the cathode 13. According to this embodiment, the through hole 32 communicating with respective one ends of the grooves 26 forms an oxidizing gas supply manifold which the oxidizing gas supplied from outside of the fuel cell flows through. The through hole 34 communicating with respective other ends of the grooves 26 forms an oxidizing gas discharge manifold which the oxidizing gas passing through the cathode 12 flows through. The through hole 30 communicating with respective one ends of the grooves 28 forms a fuel gas supply manifold which the fuel gas supplied from outside of the fuel cell flows through. The through hole 31 communicating with respective other ends of the grooves 28 forms a fuel gas discharge manifold which the fuel gas passing through the anode 13 flows through. Although being omitted from the illustration, for the purpose of regulating the internal temperature of the stack structure, a cooling medium flow path which a cooling medium flows through may be provided between all adjacent unit cells 1 or at every stack of a predetermined number of unit cells 1. The cooling medium flow path may be provided between adjacent unit cells 1 or more specifically between the separator 20 of one unit cell 1 and the separator 22 of adjacent another unit cell 1.

B. Configuration of Catalyst Layer

Figure 2:
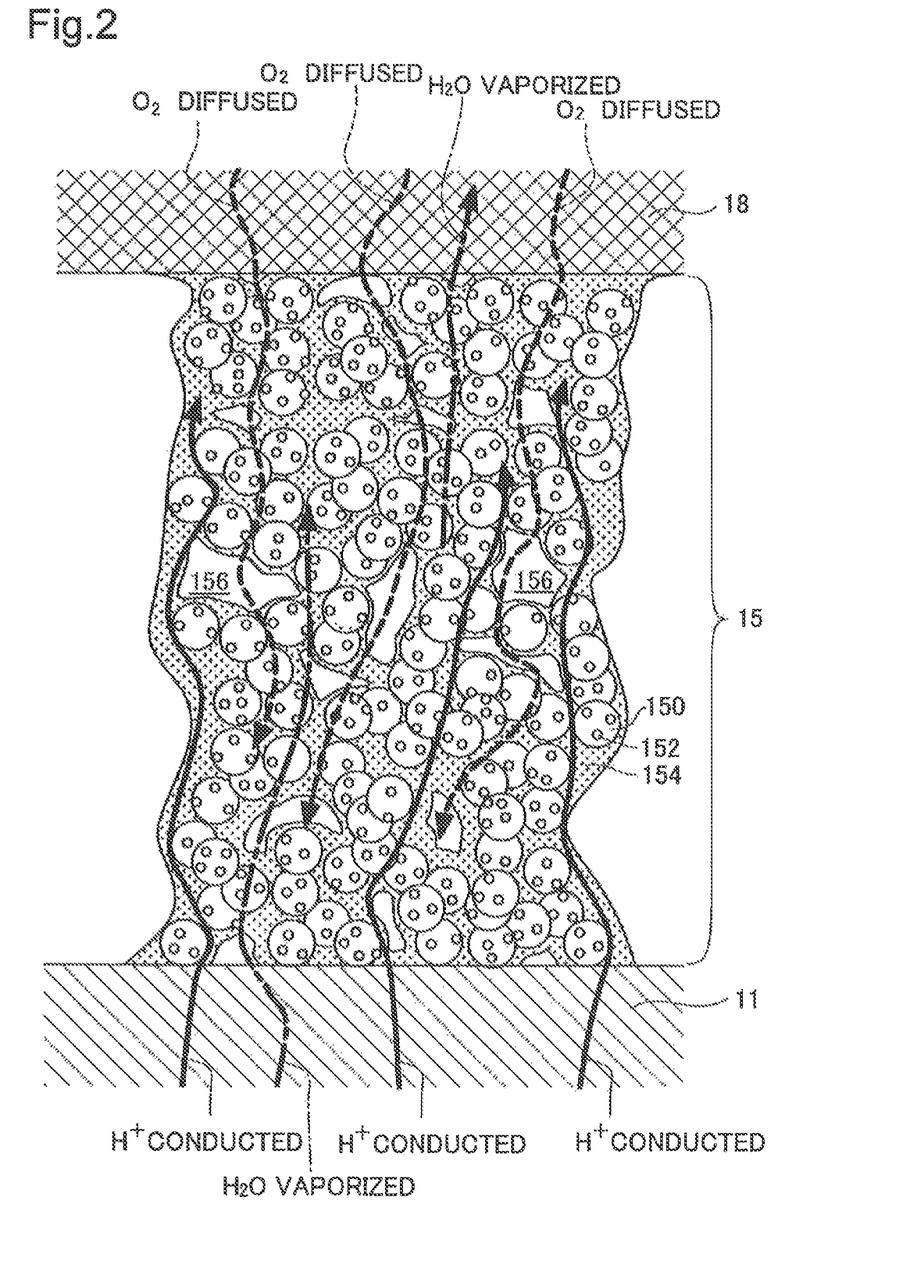
FIG. 2 is a diagram schematically illustrating the state of a cathode catalyst layer.

FIG. 2 is a diagram schematically illustrating the state of the cathode catalyst layer 15. The cathode catalyst layer 15 includes a plurality of carbon particles 150, platinum 152 supported on the respective carbon particles 150 to work as catalyst, and an ionomer 154 provided to cover the carbon particles 150 and the platinum 152. In FIG. 2, larger circles represent the carbon particles 150, and smaller circles than the circles of the carbon particles 150 represent the catalyst 152. The cathode catalyst layer 15 has a first layer located on the electrolyte membrane 11-side and a second layer located on the cathode gas diffusion layer 18-side in the thickness direction (vertical direction in FIG. 2). The first layer and the second layer are configured to have different amounts of ionomer ($g/cm^3$) across their interface. The distribution of the amount of ionomer will be described later in detail.

The proton produced on the anode 13-side (shown in FIG. 1) passes through the electrolyte membrane 11 and enters the cathode catalyst layer 15. The proton entering the cathode catalyst layer 15 reaches the catalyst 152 included in the cathode catalyst layer 15 via the ionomer 154 included in the cathode catalyst layer 15. As shown in FIG. 2, oxygen contained in the oxidizing gas supplied from the cathode gas diffusion layer 18 to the cathode catalyst layer 15 goes though voids 156 in the cathode catalyst layer 15 to be diffused throughout; the cathode catalyst layer 15 and thereby reach the catalyst 152. Although not being specifically illustrated, the electron produced on the anode side goes through an external circuit to enter the cathode catalyst layer 15 and reaches the catalyst 152 via the carbon particles 150 included in the cathode catalyst layer 15. Water is produced by reaction of the proton, the electron and oxygen reaching the catalyst 152. Additionally, during operation of the fuel cell especially at high temperature (for example, the internal temperature of the fuel cell of or above 90° C.), water included in the electrolyte membrane 11 and the cathode catalyst layer 15 is vaporized and goes through the cathode gas diffusion layer 18 to be discharged out of the fuel cell along with the cathode off-gas.

Figure 3:
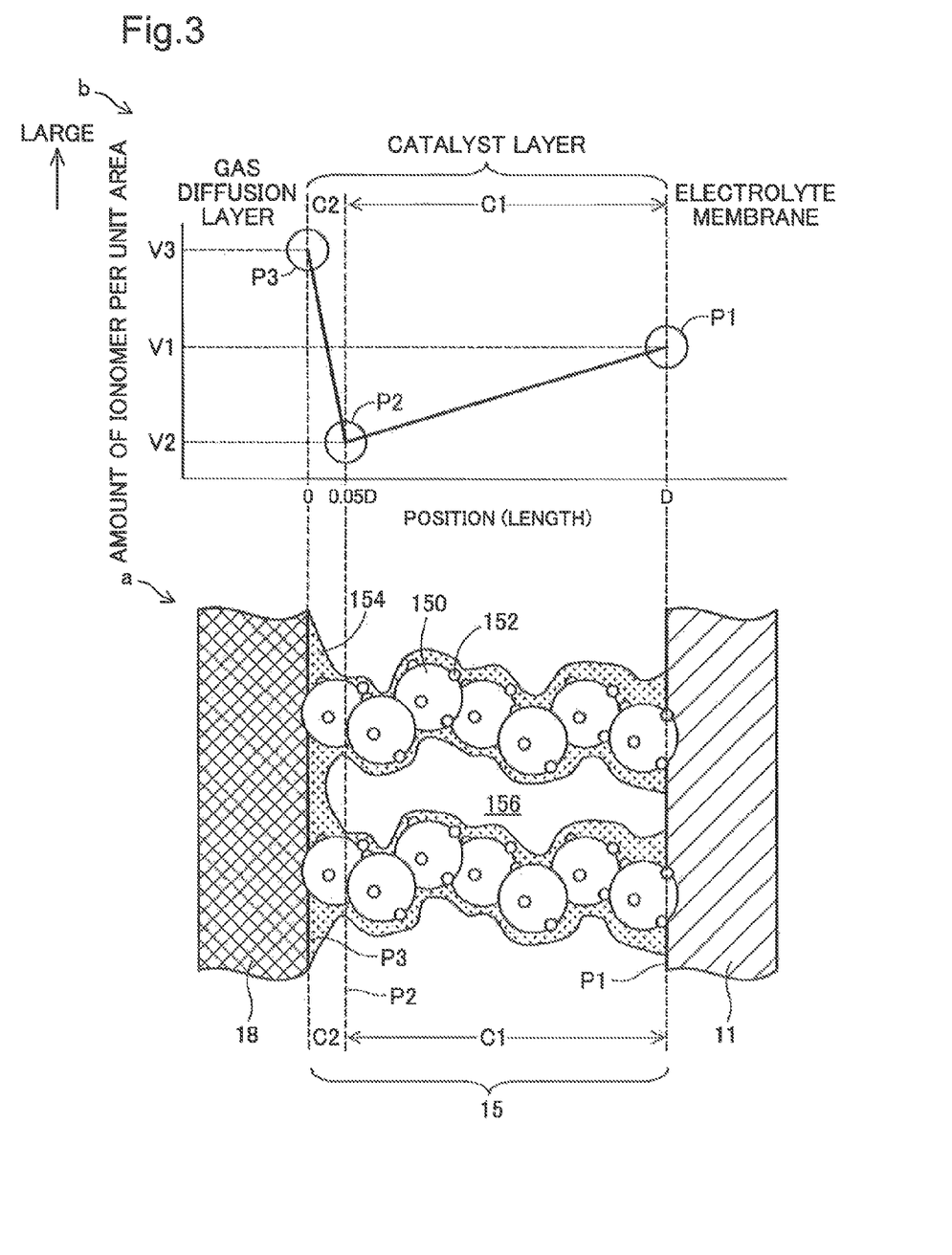
FIG. 3 is diagrams illustrating the configuration of the cathode catalyst layer and a distribution of amount of ionomer.

FIG. 3 is diagrams illustrating the configuration of the cathode catalyst layer 15 and a distribution characteristic of the amount of ionomer. More specifically, in FIG. 3, "a" illustrates the schematic configuration of the cathode catalyst layer 15, and "b" is a graph showing the distribution characteristic of the amount of ionomer. The configuration of the anode catalyst layer 14 is similar to the configuration of the cathode catalyst layer 15 and is thus not specifically described. As shown in "a" of FIG. 3, the cathode catalyst layer 15 is formed as an integral layer but is functionally divided into a first layer C1 that is in contact with the electrolyte membrane 11 and a second layer C2 that is in contact with the cathode gas diffusion layer 18. The first layer C1 and the second layer C2 are parted by a part having an abrupt change in amount of ionomer as the interface.

In "b" of FIG. 3, the abscissa of the graph shows the position in the thickness direction of the cathode catalyst layer 15, and the ordinate shows the amount of ionomer. As shown in "b" of FIG. 3, when the thickness of the cathode catalyst layer 15 is expressed as D, the thickness of the second layer C2 is 0.05·D. The thickness of the second layer C2 is, however, not limited to 0.05·D but may be a value smaller than 0.05·D, for example, 0.02·D or 0.03·D. The thickness of the second layer C2 may be a value larger than 0.05·D, for example, 0.07·D or 0.10·D.

A portion of the first layer C1 that is in contact with the electrolyte membrane 11 is called first portion P1, and a portion of the first layer C1 that is in contact with the second layer C2 is called second portion P2. A portion of the second layer C2 that is in contact with the gas diffusion layer 18 is called third portion P3. An amount of ionomer V1 in the first portion P1 is larger than an amount of ionomer V2 in the second portion P2. An amount of ionomer V3 in the third portion P3 is larger than the amount of ionomer in the first portion P1. In short, V3>V1>V2. The second layer C2 is configured such that the amount of ionomer gradually decreases from V3 to V2 with a change in position from the third portion P3 to the second portion P2. The first layer C1 is configured such that the amount of ionomer gradually increases from V2 to V1 with a change in position from the second portion P2 to the first portion P1.

The "amount ionomer" herein denotes the mass of ionomer per unit area of the cathode catalyst layer (g/cm$^3$) as described above. Instead of using this amount of ionomer, the magnitude relationship of the ionomer may be specified by an ionomer ratio or more specifically ratio of ionomer in unit area of the cathode catalyst layer. The amounts of ionomer in the first to the third portions P1 to P3 may be calculated by measuring the areas of places in which the electric current equal to or lower than −50 [nA] flows, for example, by AFM (atomic force microscope)/electric current simultaneous measurement for by conductive AFM). Measurement should be performed at a plurality of different positions in each of the portions P1 to P3. The amount of ionomer is measured at a plurality of positions included in each portion (each of P1 to P3), and an arithmetic mean of the measured amounts of ionomer at the plurality of positions is specified as the amount of ionomer in the portion (each of P1 to P3).

According to this distribution characteristic of the amount of ionomer, the porosity of the first portion P1 is lower than the porosity of the second portion P2, and the porosity of the third portion P3 is lower than the porosity of the first portion P1. This is because the amount of ionomer rather than the amount of carbon particles significantly contributes to the porosity of each portion in the catalyst layer. In other words, the magnitude relationship of the amount of ionomer may be determined, based on the calculated porosities. The higher porosity indicates the smaller amount of ionomer, and the lower porosity indicates the larger amount of ionomer.

As described above, the first portion P1 of the first layer C1 that is in contact with the electrolyte membrane 11 has the larger amount of ionomer and the lower porosity than the second portion P2. This reduces the transfer resistance of the proton. The third portion P3 of the second layer C2 that is in contact with the gas diffusion layer 18 has the larger amount of ionomer and the lower porosity than the second portion P2. This suppresses vaporized water from flowing out of the fuel cell through the gas diffusion layer 18 and thereby prevents a decrease in water content of the electrolyte membrane 11 and the catalyst layer 15. Additionally, the second portion P2 between the first layer C1 and the second layer C2 has the smaller amount of ionomer and the higher porosity than the first portion P1 and the second portion P3. This enhances the diffusibility of the reactive gas in the catalyst layer 15.

The membrane electrode assembly 10 is configured to prevent a decrease in water content of the electrolyte membrane 11 and the catalyst layer 15. The fuel cell including the membrane electrode assembly 10 is accordingly configured to suppress performance degradation in a dry environment (for example, in an environment that provides the internal temperature of the fuel cell of or above 90° C.).

The anode catalyst layer 14 placed between the electrolyte membrane 11 and the anode gas diffusion layer 16 (shown in FIG. 1B) has a substantially similar configuration to that of the cathode catalyst layer 15 placed between the electrolyte membrane 11 and the cathode gas diffusion layer 18 (shown in FIGS. 1B and 3). Accordingly, the anode catalyst layer 14 has similar advantageous effects to those of the cathode catalyst layer 15 described above. The anode gas diffusion layer 16 relative to the anode catalyst layer 14 corresponds to the cathode gas diffusion layer 18 relative to the cathode catalyst layer 15.

The thicknesses of the catalyst layers 14 and 15 are not specifically limited but are preferably between 2 μm and 25 μm, inclusive. In order to enhance the diffusibility of the reactive gas, it is preferable that the plurality of voids 156 communicate with one another in the first layer C1 of the catalyst layer 14 or 15. In order to diffuse the reactive gas supplied through the gas diffusion layer 16 or 18 to the first layer C1 located in the electrolyte membrane 11-side, it is preferable that the pores 156 in the catalyst layer 14 or 15 communicate with one another across the second layer C2 to the first layer C1.

C. Manufacturing Process

Figure 4:
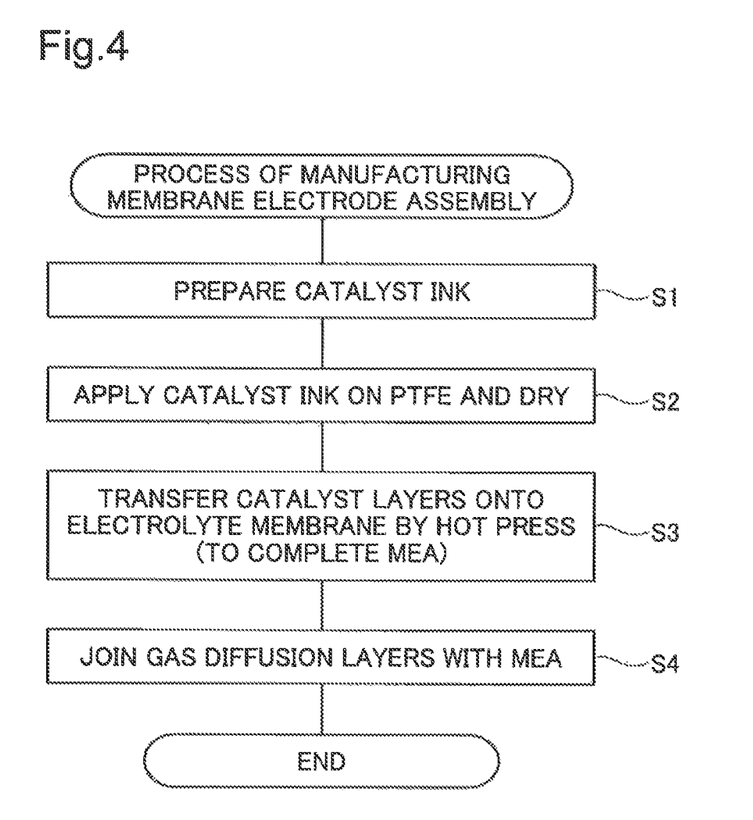
FIG. 4 is a flowchart showing a process of manufacturing the membrane electrode assembly.

FIG. 4 is a flowchart showing a process of manufacturing the membrane electrode assembly 10. As shown in FIG. 4, the process of manufacturing the membrane electrode assembly 10 first prepares catalyst ink for the cathode catalyst layer 15 (step S1). More specifically, the process distributes an ionomer and a carbon material with a platinum catalyst supported thereon at (ionomer mass/carbon mass) ratio of 1 to 1.2 in water and ethanol to prepare catalyst ink.

Subsequently the process applies the catalyst ink obtained at step S1 on a polytetrafluoroethylene (PTFE) sheet and dries the applied catalyst ink at 50° C. to 150° C. for two minutes or longer, so as to produce a cathode catalyst layer (step S2). Similarly the process produces an anode catalyst layer 14 at step S1 and step S2.

The process subsequently transfers the cathode catalyst layer and the anode catalyst layer obtained at step S2 onto an electrolyte membrane by hot press, so as to produce an MEA (membrane electrode assembly) (step S3). Applying heat and pressure during hot press causes the ionomer in the catalyst layer to be localized on the electrolyte membrane side. This provides the catalyst layer having the distribution characteristic of the amount of ionomer shown in "b" FIG. 3. Hot press may be replaced by another suitable technique such as hot roll press to apply heat and pressure.

The process then joins gas diffusion layers with the MEA by hot press to manufacture the membrane electrode assembly 10 in the form of MEGA (membrane electrode and gas diffusion layer assembly). Hot press may be replaced by another suitable technique such as hot roll press to apply heat and pressure.

D. Advantageous Effects of Embodiment

In the membrane electrode assembly 10 of the embodiment having the above configuration, the amount of ionomer V1 in the first portion P1 of the first layer C1 of the catalyst layer 15 that is in contact with the electrolyte membrane 11 is smaller than the amount of ionomer V3 in the third portion P3 of the second layer C2 that is in contact with the gas diffusion layer 18. This configuration reduces the total thickness of the catalyst layer 15. In general, a certain distance is required to increase or decrease the amount of ionomer per unit area by a predetermined value according to the position in a three-dimensional space. Additionally, the adhesion force to an adjacent layer generally decreases with a decrease in amount of ionomer. The electrolyte membrane 11 is made of the fluorinated ionomer such as Nafion (registered trademark) as described above. Even when the first portion P1 of the first layer C1 that is in contact with the electrolyte membrane 11 has the reduced amount of ionomer V1, the ionomer of the electrolyte membrane 11 serves as compensation to ensure the adhesion force between the first layer C1 and the electrolyte membrane 11. Accordingly, even when the amount of ionomer V1 in the first portion P1 of the first layer C1 is smaller than the amount of ionomer V3 in the third portion P3 of the second layer C2, the configuration of the membrane electrode assembly 10 allows for reduction in total thickness of the catalyst layer 15, while maintaining the adhesion force between the electrolyte membrane 11 and the catalyst layer 15. This results in reducing the overall thickness of the membrane electrode assembly 10.

In the above configuration of the membrane electrode assembly 10, when the thickness of the catalyst layer 15 is expressed as D, the thickness of the second layer C2 that is in contact with the gas diffusion layer 18 is equal to or less than 0.05·D. The decrease in thickness leads to a decrease in amount of ionomer and thereby improves the drainage performance. This reduces the water content between the second layer C2 and the gas diffusion layer 18 and decreases the gas diffusion resistance, thereby improving the power generation performance of the fuel cell. Making the amount of ionomer V3 in the third portion P3 larger than the amount of ionomer V2 in the second portion P2 reduces the drainage performance and suppresses drying during high-temperature operation. This, on the contrary causes accumulation of excessive water in the gas diffusion layer during low-temperature operation and is likely to deteriorate the power generation performance. It is thus advantageous to set the thickness of the second layer C2 equal to or less than 0.05·D, with the view to improving the power generation performance.

Figure 5:
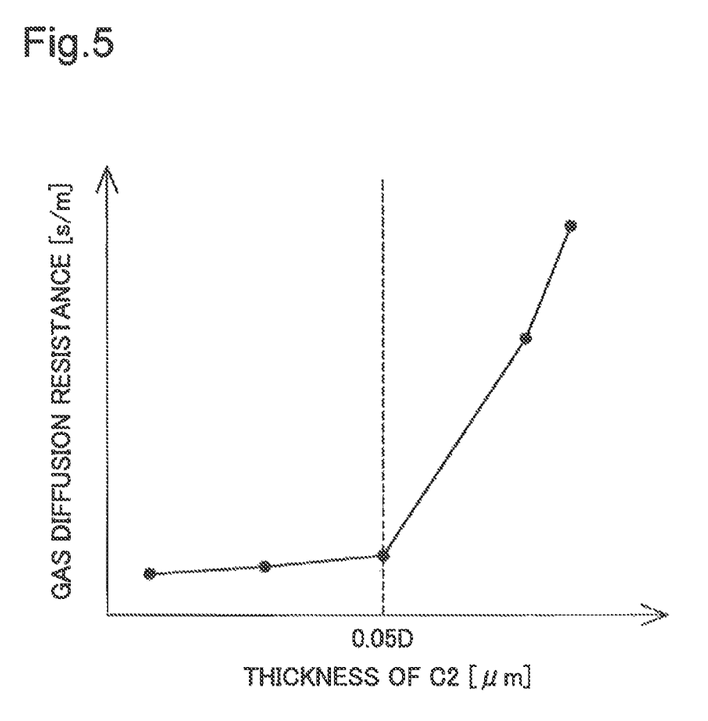
FIG. 5 is a graph showing relationship between thickness of a second layer and gas diffusion resistance.

FIG. 5 is a graph showing the relationship between the thickness of the second layer C2 and the gas diffusion resistance. This graph was obtained by measuring the gas diffusion resistance (sec/m) by the limiting current density method under the conditions that the cell temperature was 55° C., the dew point temperatures of the anode side and the cathode side were 60° C./60° C., the flow of hydrogen supplied as the anode gas was 0.5 mL/min, and the flow of gas mixture of 1% oxygen and 99% nitrogen supplied as the cathode gas was 1.0 L/min. As shown in this graph, at the thickness of the second layer C2 of less than 0.05·D, the gas diffusion resistance is kept stable at the low level.

E. Modifications

Components other than those described in independent claims among components of the above embodiment are additional components and may be omitted appropriately. The invention is not limited to any of the above embodiment and its modifications but may be implemented by a diversity of aspects and configurations without departing from the scope of the invention. Some of possible modifications are given below.

E-1. First Modification

In the above embodiment, each of the cathode catalyst layer 15 and the anode catalyst layer 14 is configured to have the first layer and the second layer. According to a modification, only one of the cathode catalyst layer and the anode catalyst layer may be configured to have a first layer and a second layer. In this modification, the other catalyst layer that does not have a first layer and a second layer may be produced by any known technique. For example, the other catalyst layer may be produced by spraying a catalyst ink comprised of platinum, carbon particles and an ionomer onto a surface of an electrolyte membrane and drying the sprayed catalyst ink.

E-2. Second Modification

In the above embodiment, the second layer C2 is configured such that the amount of ionomer gradually decreases from V3 to V2 with a change in position from the third portion P3 to the second portion P2. According to one modification, the second layer C2 may be configured such that the amount of ionomer decreases from the third portion P3 to the second portion P2 as the overall tendency but increases in some part. In the above embodiment, the first layer C1 is configured such that the amount of ionomer gradually increases from V2 to V1 with a change in position from the second portion P2 to the first portion P1. According to one modification, the first layer C1 may be configured such that the amount of ionomer increases from the second portion P2 to the first portion P1 as the overall tendency but decreases in some part. Additionally, the configuration of gradually decreasing or increasing the amount of ionomer may be replaced by a configuration of decreasing or increasing the amount of ionomer in a stepwise manner. In other words, the second layer C2 or the first layer may have any configuration that causes the amount of ionomer V1 in the first portion P1 to be larger than the amount of ionomer V2 in the second portion P2 and that causes the amount of ionomer V3 in the third portion P3 to be larger than the amount of ionomer V1 in the first portion P1.

E-3. Third Modification

The above embodiment uses platinum as the catalyst. The catalyst is, however, not limited to platinum but may be any of various other catalysts that accelerate the electrochemical reaction. Available examples of the catalyst include noble metals such as platinum, vanadium and palladium and alloys including such noble metals.

E-4. Fourth Modification

The above embodiment uses carbon particles as the carrier with a catalyst supported thereon. The carrier is, however, not limited to carbon particles but may be any of various other materials having good electrical conductivity. For example, a metal material such as stainless steel may be employed for the carrier. The catalyst layer may not necessarily include the carrier but may be comprised of a catalyst and an ionomer.

The invention is not limited to any of the embodiment and its modifications described above but may be implemented by a diversity of configurations without departing from the scope of the invention. For example, the technical features of any of the embodiment and its modifications corresponding to the technical features of the respective aspects described in Summary may be replaced or combined appropriately, in order to solve part or all of the problems described above or in order to achieve part or all of the advantageous effects described above. Components other than those described in independent claims among components of any of the embodiment and its modifications are additional components and may be omitted appropriately.

What is claimed is:

1. A membrane electrode assembly, comprising
an electrolyte membrane;
a catalyst layer that is formed on a surface of the electrolyte membrane and includes a catalyst and an ionomer; and
a gas diffusion layer that is formed on a surface of the catalyst layer on an opposite side to the electrolyte membrane,
wherein the catalyst layer includes;
a first layer that is in contact with the electrolyte membrane and
a second layer that is in contact with the gas diffusion layer,
wherein the catalyst layer further includes:
a first portion in the first layer, the first portion being in contact with the electrolyte membrane;
a second portion in the first layer, the second portion being in contact with the second layer; and
a third portion in the second layer, the third portion being in contact with the gas diffusion layer, wherein
an amount of the ionomer in the first portion is larger than an amount of the ionomer in the second portion, and
an amount of the ionomer in the third portion is larger than the amount of the ionomer in the first portion.

2. The membrane electrode assembly according to claim 1,
wherein when the catalyst layer has a thickness D, the second layer of the catalyst layer has a thickness equal to or less than 0.05·D.

3. A fuel cell, comprising
the membrane electrode assembly according to claim 1; and
a pair of separators that are arranged to place the membrane electrode assembly therebetween.

* * * * *